United States Patent
Claassen et al.

(10) Patent No.: US 6,202,774 B1
(45) Date of Patent: Mar. 20, 2001

(54) TRANSPORT MODULE FOR THE MOVING OF HEAVY LOADS

(75) Inventors: Josephus Antonius Maria Claassen, Eindhoven; Berend Drenth, Hertogenbosch; Marten Fluks, Vianen, all of (NL)

(73) Assignee: Mannesmann Rexroth AG, Lohr/Main (DE)

( * ) Notice: Subject to any disclaimer, the term of this patent is extended or adjusted under 35 U.S.C. 154(b) by 0 days.

(21) Appl. No.: 09/117,871

(22) PCT Filed: Feb. 1, 1997

(86) PCT No.: PCT/DE97/00201

§ 371 Date: Nov. 11, 1998

§ 102(e) Date: Nov. 11, 1998

(87) PCT Pub. No.: WO97/29032

PCT Pub. Date: Aug. 14, 1997

(30) Foreign Application Priority Data

Feb. 8, 1996 (DE) ............................................... 196 04 513

(51) Int. Cl.⁷ .................................................. B62D 51/06
(52) U.S. Cl. .............................. 180/8.5; 180/8.1; 180/8.6
(58) Field of Search ........................ 180/8.1, 8.5, 8.6, 180/7.1; 254/89 H, 93 VA

(56) References Cited

U.S. PATENT DOCUMENTS

| | | | | |
|---|---|---|---|---|
| 1,511,960 | * | 10/1924 | Goldschmidt | 180/8.1 |
| 2,785,761 | | 3/1957 | Becker . | |
| 3,446,301 | * | 5/1969 | Thomas | 180/8.1 |
| 3,774,352 | * | 11/1973 | Weber | 254/104 |
| 3,831,691 | * | 8/1974 | Jenkins | 180/8.1 |
| 4,382,580 | * | 5/1983 | Hellander | 254/89 H |
| 4,519,468 | * | 5/1985 | Mick | 180/8.5 |
| 4,615,258 | * | 10/1986 | Hirmann | 92/40 |
| 4,785,902 | * | 11/1988 | Ochiai | 180/8.1 |
| 4,918,956 | * | 4/1990 | Schoch | 72/21 |
| 5,096,009 | | 3/1992 | Hirmann . | |
| 5,330,396 | * | 7/1994 | Lohr et al. | 476/10 |

FOREIGN PATENT DOCUMENTS

1245464 * 9/1960 (FR) ..................................... 180/8.1

* cited by examiner

*Primary Examiner*—J. J. Swann
*Assistant Examiner*—Michael Cuff
(74) *Attorney, Agent, or Firm*—Martin A. Farber

(57) ABSTRACT

A simply-designed, multi-purpose transport module with which heavy loads can be moved over the ground has the following features: a frame, on which the load is laid, is positioned on the floor. A support is positioned on the floor. The ground loading pressure of the frame, on an increase of the ground pressure loading of the support, and the ground pressure loading of the support, on an increase of the ground pressure loading of the frame, can be reduced to below the unloaded weight through an actuator of the frame or of the support. The frame and the support have a first pair of inclined paths through which the frame can be supported on the support and the frame is displaceable horizontally with respect to the support on achieving a sufficient reduction of its ground pressure loading. The frame and the support have a second pair of inclined paths through which the support can be supported on the frame and the support is displaceable horizontally with respect to the frame on achieving a sufficient reduction of its ground pressure loading. A load can be moved forward in a step-wise manner with such a transport module.

25 Claims, 6 Drawing Sheets

TRANSPORT MODULE FOR THE MOVING OF HEAVY LOADS

FIELD AND BACKGROUND OF THE INVENTION

The invention relates to a transport module with which heavy loads can be moved over a floor.

Various systems are known and in use for the horizontal transport of large heavy loads. The principles used are for example:

a) shifting the heavy load on sliding surfaces with which the supports of the heavy load ere provided;

b) transport on wheels with the aid of transport carriages that have tires or steel wheels rolling on rails;

c) shifting a load that is suspended by the use of pneumostatic or hydrostatic bearings;

d) travel in which the load is both raised and transported horizontally.

Horizontal load movement can take place continuously in cases b) and c). In case a) it is at least discontinuous. In case d) the movement is theoretically discontinuous, Each of the known solutions for the horizontal transport of large heavy loads has certain disadvantages. For example, high driving forces are required when shifting on sliding surfaces. Energy consumption is relatively high, especially when shifting on sliding surfaces or on a cushion and when moving. The drives are expensive and cumbersome and impose high requirements on floor quality.

SUMMARY OF THE INVENTION

Hence, the basic object of the invention is to provide a transport module that can be used as an independent unit individually or together with other similar modules for moving a heavy load, that allows moving the load with a relatively low energy consumption, and that imposes no special requirements on the floor.

A transport module of the invention has as a main part a frame on which the load can be placed and that can be placed on the floor. As a second main part, the transport module has a support that can likewise be placed on the floor. By means of an actuator that is part of the frame or the support, the force applied to the floor by the frame can be reduced by increasing the force with which the support contacts the floor and the force with which the support contacts the floor can be reduced below its own weight by increasing the force with which the frame contacts the floor. The frame and the support have a first pair of steep paths formed by inclined surfaces of wedge-shaped components of the module, by which the frame can be supported on the support. By means of the actuator, the normal force between the frame and the floor, in other words the force directed against the floor by the frame and hence the frictional force between the floor and the frame, can be reduced to the point where the frame, and the load with it, travels along the sloping path of the support and is thus moved horizontally. At this time the frame is raised by the actuator further and further relative to the support. The speed with which the frame is raised can be used to control the speed at which the load moves. Normally the frame does not lift off the floor, since the horizontal force produced by the sloping paths and the combined weight of the frame and the load overcomes the force of friction between the frame and the floor even before the frame lifts off the floor. Energy consumption is therefore lower than in a form of movement in which the load is raised completely from the floor. It is also less than in a type of movement in which the normal force and consequently the force of friction is not reduced.

The frame and the support have a second pair of sloping paths by which the support can be supported on the frame., The force with which the support contacts the floor can also be reduced by the actuator so that the support always follows the frame. A heavy load can therefore be moved discontinuously in a transport module according to the invention.

A transport module according to the invention can be used individually, but preferably together with one or more additional transport modules to move a load. The actuators of the various transport modules are then controlled relative to one another.

The support can support the frame located above it in a simple fashion. The support, on the other hand, hangs from the frame when it is moved. For this purpose, the frame uses second guide elements to grip beneath first guide elements located on opposite sides of the support. The second pair of steep, or sloping, paths is located on the first and second guide elements.

In the partial step of the movement in which the load is shifted, the weight of the load and at least a portion of the weight of the frame must be supported by the support. This is accomplished by means of the first pair of steep paths. In order not to allow the load on the parts to become too high, especially the pressure per unit area, the first pair of steep paths is therefore advantageously formed by a pair of steep surfaces that slide on one another. In the partial step in which the support follows the frame, at least a portion of the weight of the support is conducted through the second pair of steep paths into the frame and through the latter into the floor. The forces that are transmitted through the second pair of steep paths are therefore much smaller than the forces that are transmitted by the first pair of steep paths. Advantageously, therefore, the first pair of steep paths is formed by a steep surface and by rolling bodies that roll on it. Therefore the support moves even when the load on the floor exerted by the support is reduced slightly and the frictional force between the support and the floor is reduced accordingly. Three rollers for suspending the support on the frame will suffice if the rollers are arranged in accordance with other features of the invention.

Because the floor underneath the transport module can be uneven, a universal joint is provided in the support or in the frame that allows the corresponding guide block with the steep paths to tilt with respect to the other parts of the frame or the support to allow compensation for unevenness of the floor.

According to a feature of the invention, the actuator is associated with the support, and can be used to change the relative vertical position of a guide block that includes the steep paths of the support with respect to a floor-supporting body of the support. The association of the actuator with the support has the advantage that the guide blocks and the steep paths of the support and frame can be relatively far from the floor. The greater the distance between the guide blocks with the steep paths from the floor, the better they are protected against contamination.

The actuator is advantageously arranged in such fashion that its adjusting movement takes place at least approximately simply vertically with respect to the floor. Thus, adjustment of the actuator alone does not produce any horizontal movement of the frame or the support that would be superimposed on the movement along the steep paths. The actuator is preferably formed by a double-acting hydraulic piston-cylinder unit, since high forces can be produced even with relatively small hydraulic drive components. The use of a hydraulic piston-cylinder unit as an actuator therefore permits a compact design for the transport module.

By designing the transport module to shift a heavy load in a straight line, it is also possible to shift the heavy load parallel. Therefore, the load can be moved while retaining its alignment in a plane. This is accomplished by virtue of the fact that a first guide block of the frame with its steep paths and a second guide block of the support with its steep paths can be rotated in common around a vertical axis relative to a floor support body. Preferably, the two guide blocks can be rotated in an angle range of at least 270° relative to the floor support body of the frame so that a load can move parallel to a plane at every point.

The movement possibilities for a load that rests on a plurality of transport modules according to the invention are further expanded by the fact that the transport modules are designed according to further features of the invention. A load can then be rotated or can round a curve, in other words the alignment of a load can be changed. It is important for this type of movement th at there be lateral play between the two guide blocks of the frame and the support and that centering means be provided for centering the guide blocks with respect to one another in a neutral central position. The lateral play between the two guide blocks permits a slight transverse shift between the two guide blocks, and the centering means ensure that at the beginning of a movement step there are equal distances on both sides between the two guide blocks. The alignment of a load can also be modified using transport modules if the two guide blocks are not rotatable with respect to the floor support body of the frame. However, the transport modules must then be brought, suitably aligned, beneath the load. The central axis of the movement cannot simply be changed. When rounding a curve with a change in load orientation, the guide block of the frame is not only shifted in the transverse direction but is also rotated slightly. A rotary joint can be provided in the support so that the guide block of the support can participate in the rotation of the guide block of the frame.

It is advantageous if, the relative movement between the frame and the support in the direction of travel can be detected by a travel sensor. Then a plurality of transport modules supporting a load can be controlled precisely as the load rounds a curve.

A supporting part of the frame that has the supporting surface for the load can be adjustable heightwise. Then a transport module with the support part lowered can easily be placed beneath a load supported by other supports. The supporting part is then moved upward and the load lifted free of the other supports. The latter can then be removed. The process is reversed when setting down the load on other supports. A depression or elevation in the floor over which one of a plurality of transport modules carrying the same load is traveling, can be compensated. There is also a freer choice of support locations on the load, which can now have different height settings.

The supporting part is preferably adjustable heightwise by means of a hydraulic cylinder. The weight of the load can be determined easily by pressure measurement, with assurance of course being provided that the load is supported hydraulically on each of the transport modules supporting it, in other words there is a fluid cushion between the piston and the cylinder housing in each hydraulic cylinder.

The movement of the supporting surface for the load on the frame is not fixed relative to the floor on which the frame stands, and in particular the travel of the supporting surface need not be parallel to the floor. Instead, the supporting surface can adjust itself depending on the conditions prevailing between the load and the floor.

The drawings show an embodiment of a transport module according to the invention as well as several schematic diagrams to explain the motion process during the shifting of a load and to clarify the movement possibilities for a load.

BRIEF DESCRIPTION OF THE DRAWINGS

With the above and other objects and advantages in view, the present invention will become more clearly understood in connection with the detailed description of a preferred embodiment, when considered with the accompanying drawings, of which.

DETAILED DESCRIPTION OF THE PREFERRED EMBODIMENT

Figure 1:
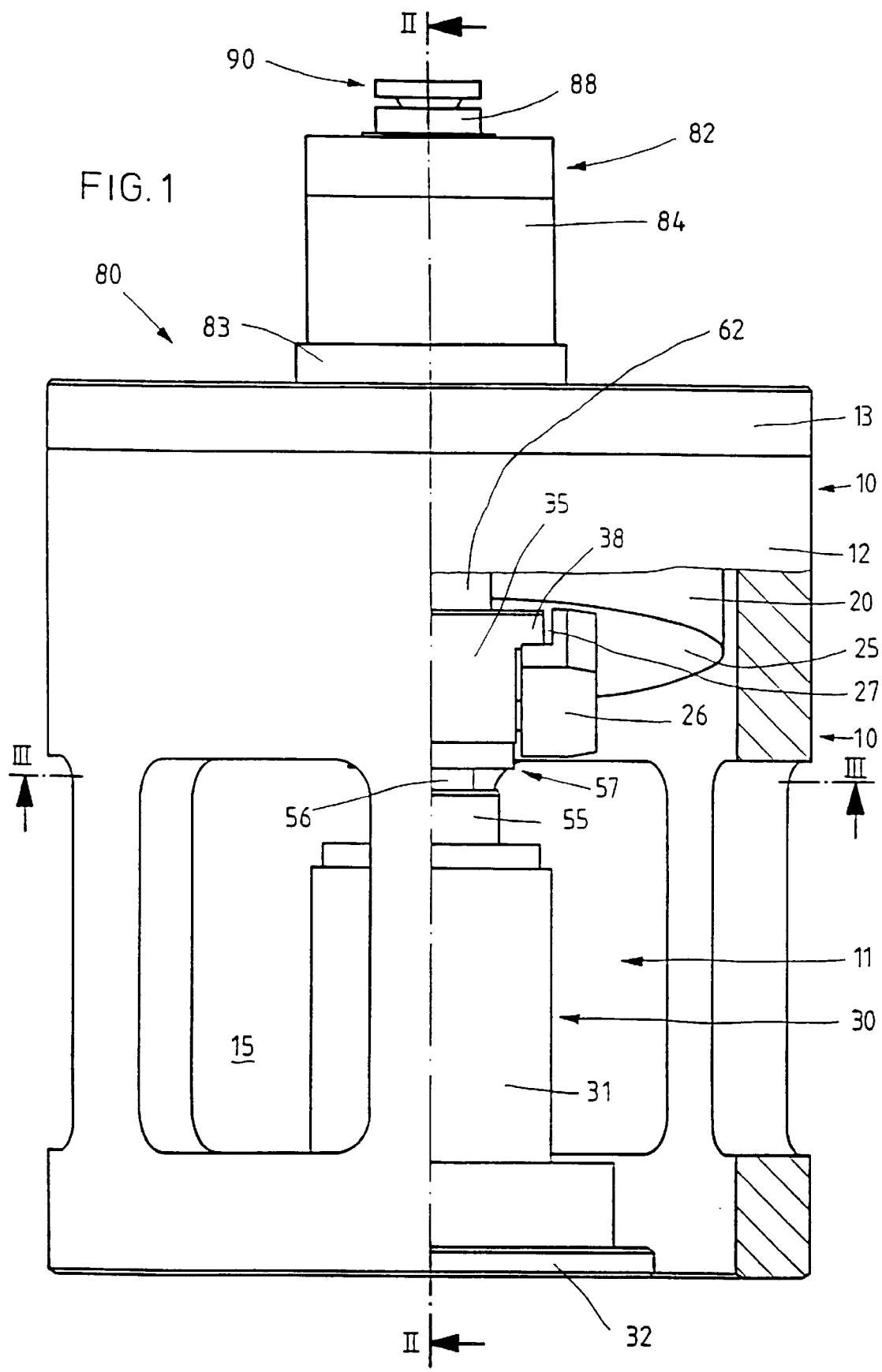
FIG. 1 shows the embodiment in a side view, with the frame partially cut away for a better view of the support.

The transport module 80 shown in FIGS. 1 to 4 can be imagined as being composed of two main parts, namely a frame 10 and a support 11, with one main part being shifted relative to the other main part resting firmly on the floor in each case to move a load. The load does not move when support 11 moves.

Frame 10 has a pot-shaped floor-abutting body consisting of a circularly cylindrical jacket 12 and a plate 13 fastened by bolts 14 to one end of jacket 12. The jacket 12 can rest on the floor by the free end. Openings 15 are provided in the jacket 12 to reduce the weight, and the openings also allow a view of the support 11 located inside the frame.

A stepped bore 16 is located centrally in the plate 13. In the vicinity of this bore 16, a single-acting lifting cylinder 82 is mounted on the plate 13. The bore 16 is covered on the top firstly by a bolted-on intermediate plate 83 provided with a hollow for centering the lifting cylinder 82. An adjustment between the size of the bore 16 and the lifting cylinder 82 can be made by using the intermediate plate 83, with the cylinder preferably being chosen from commercial sizes.

If no lifting cylinder 82 is mounted, the bore 16 can also be protected against the penetration of dirt by a cover that does not project beyond the plate 13.

The lifting cylinder 82 has an essentially bipartite cylinder housing 84 consisting of a housing pot 85 and a cylinder head 86. Inside the cylinder housing 83 a piston 87 is displaceable on which a piston rod 88 that has a diameter smaller than that of piston 87 is mounted, with the piston rod emerging through the cylinder head 86. At its outer end the piston rod 88 is provided with a ball joint 89, into which a supporting part 90 is inserted that has a ball segment 91 whose radius matches the radius of ball joint 89. A supporting surface 92 for a load is located on a flange 93 of the supporting part 90 that projects beyond the ball segment 91. This, and with it the support surface, are therefore tiltable within limits on all sides. When the piston rod 88 is retracted, the force of gravity and a coil compression spring 94 cooperate so that the spring is accommodated in the annular space formed by the cylinder housing 84, the piston 87, and the piston rod 88. An ability of the supporting part with the supporting surface to tilt in all directions relative to the other parts of the frame is also advantageously provided if the supporting part is not height-adjustable.

To transport a load, a plurality of transport modules 80 is normally used. Initially, the pressure chambers located between the piston 87 and the bottom of the housing part 85 are charged with a pressure medium until the piston 87 extends for approximately half the lifting height. Then the pressure chambers are cut off from the pressure medium source. The transport modules 80 that are used are subdivided into lifting groups so that a statically determined support for the load is provided and the pressure chambers of a lifting group are connected hydraulically with one another. Pressure medium can flow back and forth between the pressure chambers of the transport modules 80 of a lifting group because the pistons are not originally in an end position.

A wedge-shaped guide block 20 of the frame 10 with a pin 21 that can rest by a collar 22 on the step 23 of the bore 16 is supported in the bore 16 so that it is rotatable around the central axis 24 of the frame 10 that normally extends essentially vertically relative to its floor support body consisting of jacket 12 and plate 13 when the transport module is in use. An axial bearing for the guide block 20 is formed by the collar 22 of the pin 21 and the step 23 of the bore 16.

Figure 2:
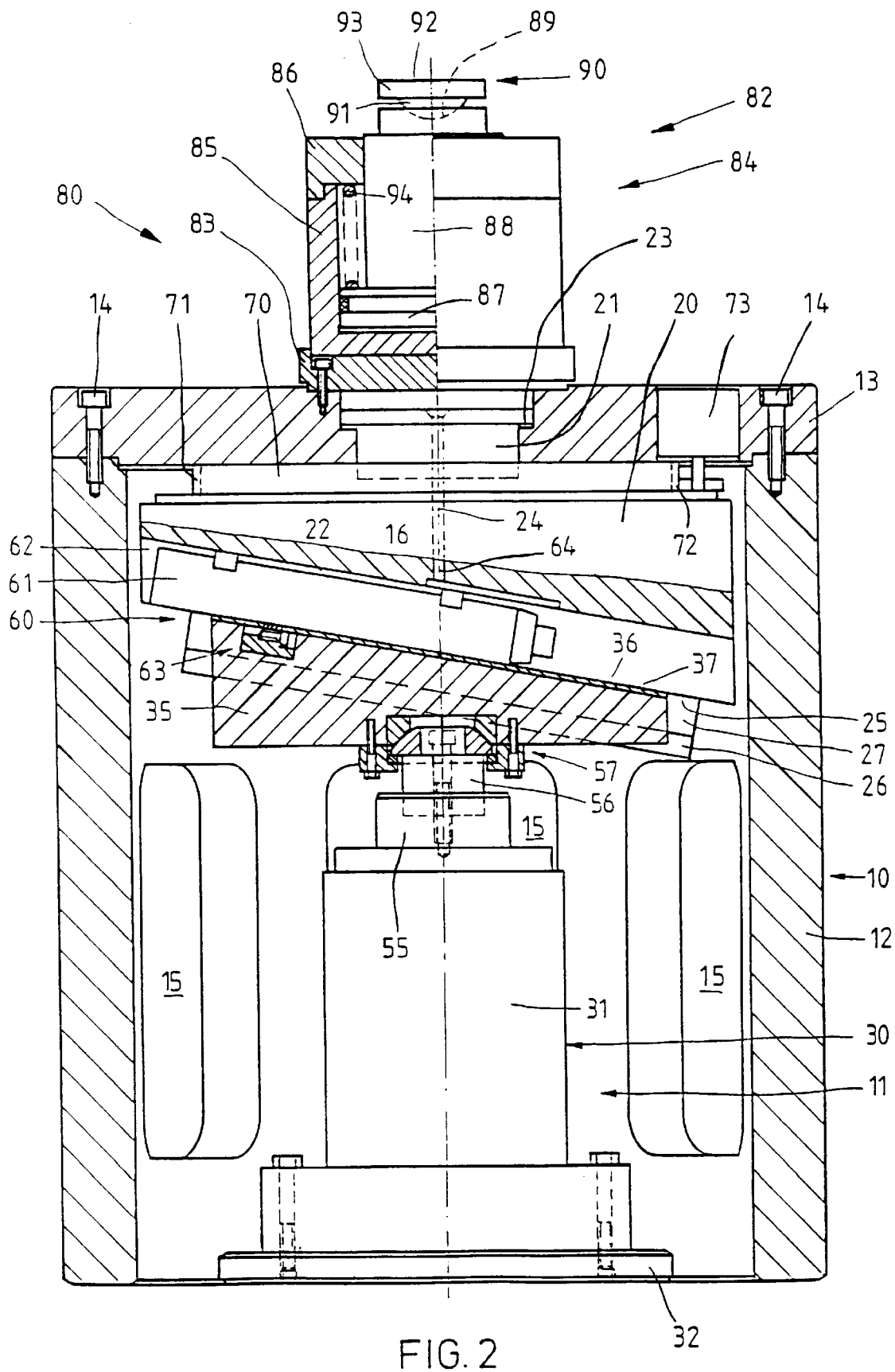
FIG. 2 is a section along line II—II in FIG. 1, in which the support is shown partially only in a front view.
Figure 3:
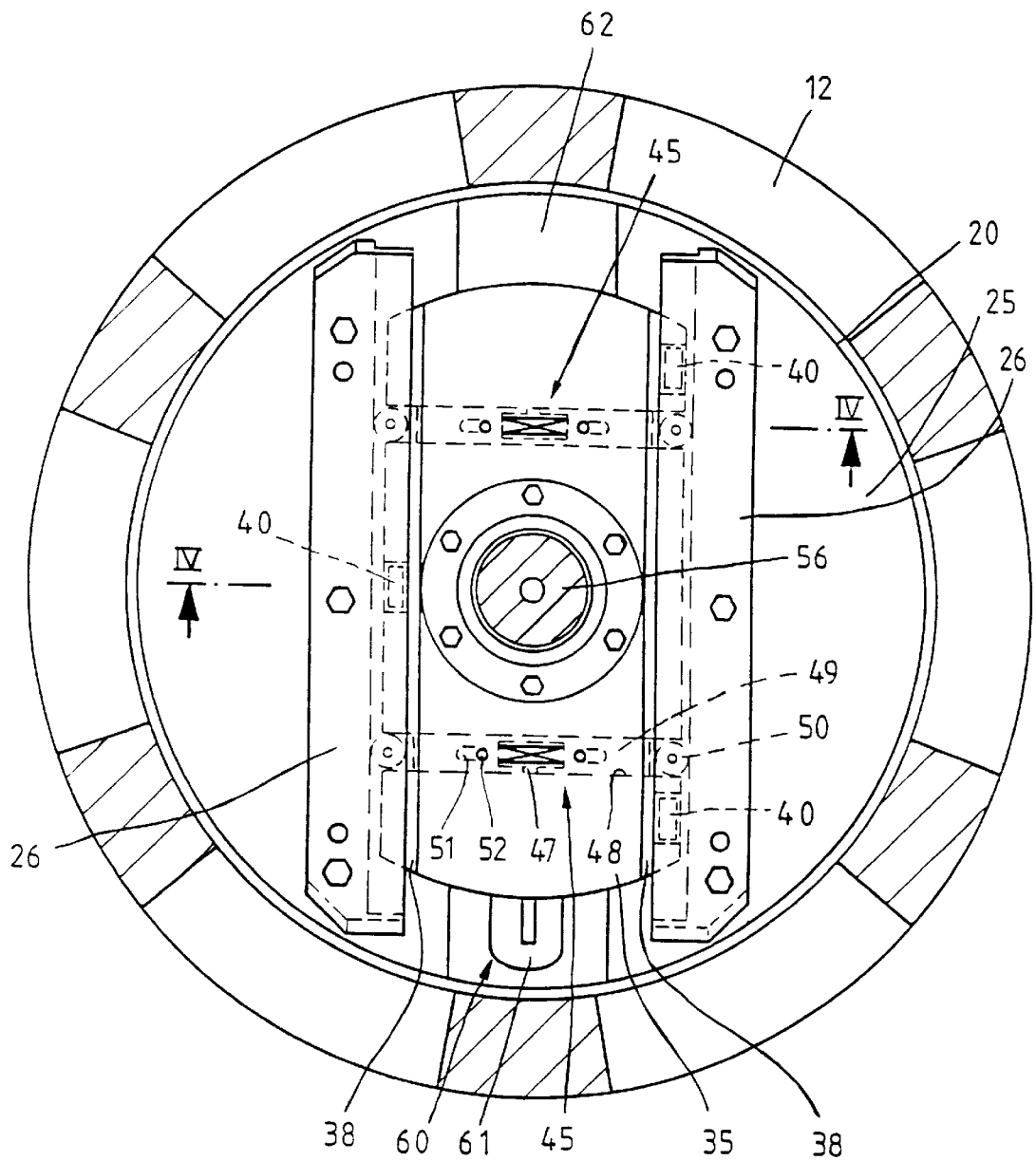
FIG. 3 shows a section along line IV—IV in FIG. 1 on a slightly enlarged scale.

The guide block 20 can abut the plate 13 internally over a large area, as shown in FIG. 2. There is a small space between the collar 22 of the pin 21 and the step 23 of the bore 16.

Facing away from the plate 13, the guide block 20 has a wedge surface 25 inclined approximately 10° to the plane of the plate 13. On the wedge surface, at a distance from one another and parallel to one another, two L-shaped guide strips 26 are bolted so that a guide groove 27 is provided between each guide strip and wedge surface 25, with the groove being open toward the other guide strip in each case. The two guide strips 26 extend in the direction of the greatest slope on the wedge surface 25.

The support 11 is essentially formed by a hydraulic piston-cylinder unit 30, which can stand on the floor by means of a floor plate 32 bolted to the cylinder 31, and by means of a second wedge-shaped guide block 35 that has a wedge surface 36 facing the first guide block 20, by which it is provided with a sliding support 37 that reduces friction. The slope of the wedge surface 36 is the same as the slope of the wedge surface 25. The two guide blocks 20 and 35 can rest on one another over a large area by the two wedge surfaces 25 and 36.

Figure 4:
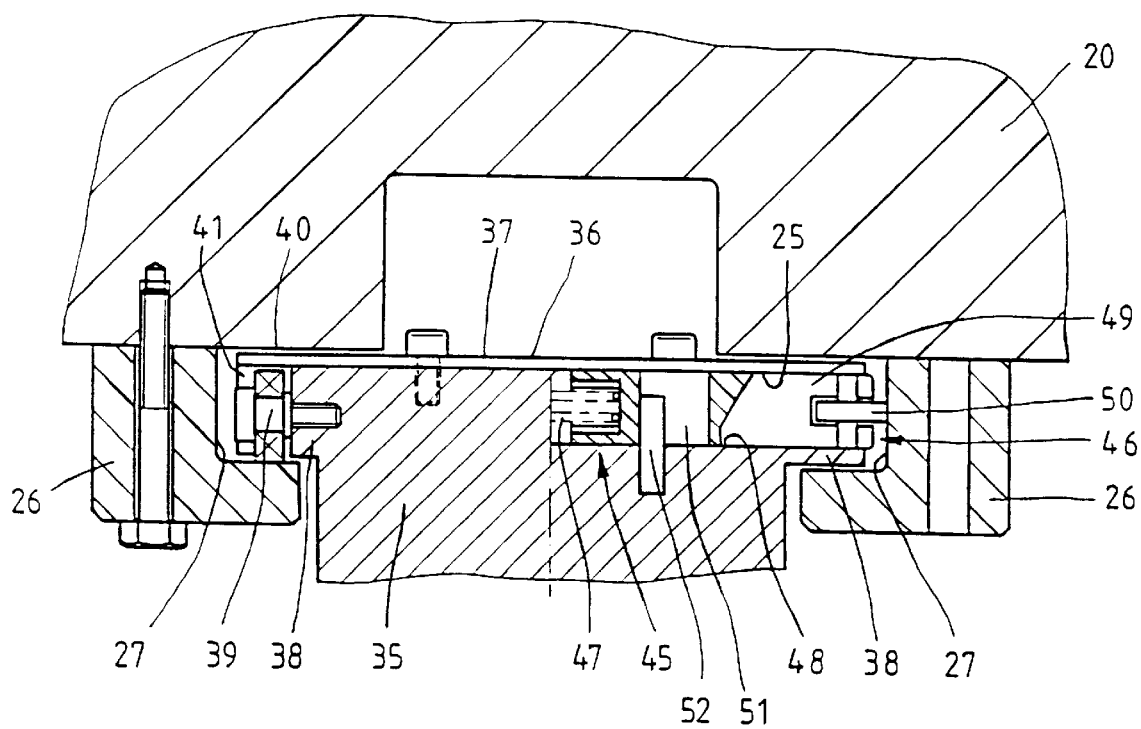
FIG. 4 shows a partial section along line IV—IV in FIG. 3 on an enlarged scale.

As is especially clear from FIG. 4, the guide block 35 has lateral guide strips 38 with which it engages the guide grooves 27 of the guide block 20. Two ball bearings 40 are each fastened by a threaded bolt 39 to the other strip 38, at a distance from one another. Another ball bearing 40 is mounted on one guide strip 38 by a threaded bolt 39 on the other guide strip 38, centrally between the two ball bearings 40. The three ball bearings 40 are therefore located at the corners of a triangle. They are each located in recesses 41 of the respective guide strips 38. Their outer rings form rollers that can roll along the lower side walls of a guide groove 27. As soon as the wedge surfaces 25 and 36 of the two guide blocks 20 and 35 abut one another, there is a distance between the ball bearings 40 and the corresponding side wall of the guide grooves 27. Conversely, there is a distance between the wedge surfaces 25 and 36 when the ball bearings 40 abut the guide strips 26, as shown in FIG. 4.

It is clear from the figures that the distance between the two guide strips 26 of the guide block 20 is larger by a certain amount than the width of the guide block 35, both in the vicinity of the guide strips 38 and also in an area below the latter. This means that transverse displacement is possible perpendicularly to the lengthwise direction of the guide strips, in addition to pivoting between the two guide blocks, because of the play that exists as a result of the different dimensions. If no external forces are applied, however, the two guide blocks 20 and 35 will assume a central position in which the spaces between the second guide block 35 and the two guide strips 26 of the guide block 20 will be the same size. The central position is caused by two centering devices 45, each of which has two spring supports 46 and a compression spring 47 tensioned between the two spring supports. The two spring supports 46 and the compression springs 47 are located in a transverse groove 48 of the second guide block 35 covered by the sliding layer 37. Each spring support consists of a pin 49 guided in the transverse groove 48 and a ball bearing 50 mounted on the pin, with the outer race of the bearing being able to roll along the bottom of a guide groove 27. Each pin 49 is provided with an elongate recess 51 in the lengthwise direction of the transverse groove 48, into which recess a pin 52 mounted in the guide block 35 projects. As a result, the outward travel of a pin 49 is limited. When the two guide blocks 20 and 35 assume the centered central position relative to one another, the pins 49 are pressed by compression springs 47 against the respective pins 52. There is then a very small space between the ball bearings 50 and the guide strips 26 of the first guide block 20. If the two guide blocks 20 and 35 are shifted transversely by more than this minimum distance, one pin 49 of a centering device 45 will be forced backward while the other remains at rest because of the pin 52. As a result, the spring 47 will be pretensioned to a greater degree.and[ ]will produce a restoring force. The two transverse grooves 48 and with them the two centering devices 45 are located at equal distances from the central axis of support 11.

Figure 5:
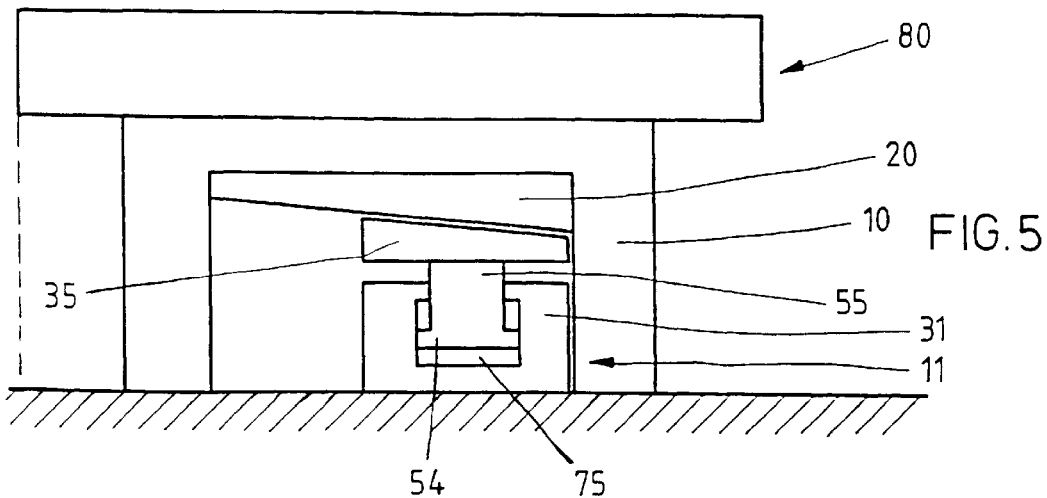
FIG. 5 shows schematically the frame and the support of a transport module at the beginning of a movement cycle.
Figure 7:
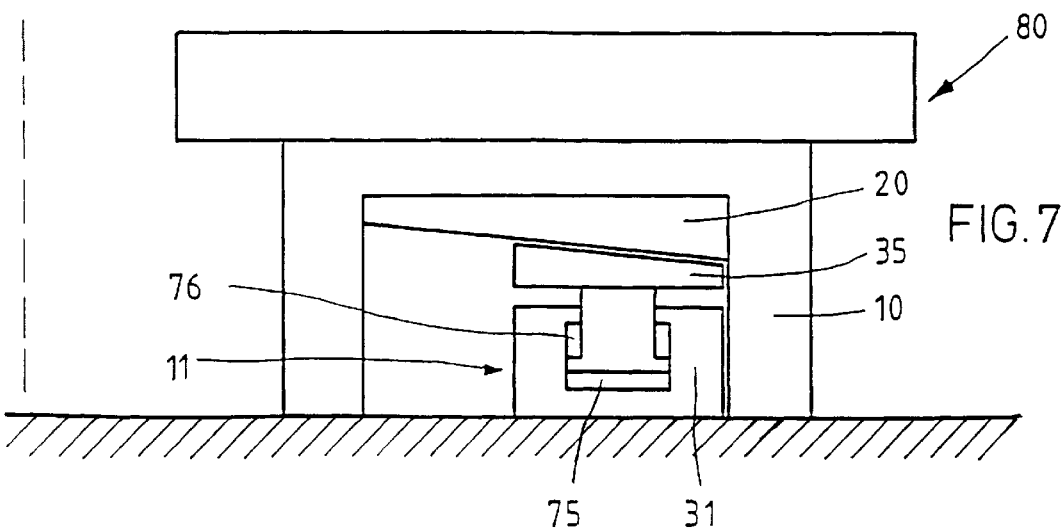
FIG. 7 shows the transport module according to FIGS. 5 and 6 after the support follows.

The piston-cylinder unit 30 is double-acting and has a piston rod 55 that projects from the cylinder 31, with the rod being connected inside the cylinder 31 with a piston 54 shown in FIGS. 5 and 7 and which at its free end supports the guide block 35 by means of an adapter 56 and a universal joint 57. The universal joint 57 allows the guide block 35 to tilt slightly relative to the central axis of the cylinder 31. As a result, any unevenness in the floor that results in different alignments of the central axes of the frame and the support can be compensated. A rotary joint is formed between the piston 54 and the cylinder 31.

The path that the support 10 and the frame 11 travel with respect to one another can be detected by a travel sensor 60 which is in the form of a potentiometer in the embodiment. Part 61 of the travel sensor that moves together with the frame 10 is accommodated in a groove 62 that is located in the wedge surface 25 of the guide block 20 and runs in the direction of its greatest slope. The part 61 contains a wound electrical resistance and an electrical wiping path. The wiper 63 is fastened in a recess in the guide block 25 of the support 11 and travels along the wound electrical resistance and on the wiping path. From the part 61, three electrical cables not shown in greater detail, two of which are connected with the ends of the resistance and one with the wiping path, are brought out through a channel 64 located in axis 24. Even when the travel sensor 60 is inclined to the horizontal in exactly the same way as the wedge surfaces 25 and 36, the horizontal movement between the frame 10 and the support 11 can easily be detected since the slope is known.

A bead 70 of the guide block 20 located directly below the plate 13 is provided externally with teeth 71. A pinion 72 meshes with these teeth, said pinion being driven by a hydraulic motor 73 fastened to the plate 13. Alternatively a drive motor can also be mounted externally on the frame 10 and driven for example by a wheel connected nonrotatably with pinion 72 by a belt, chain, worm, or similar drive.

Figure 6:
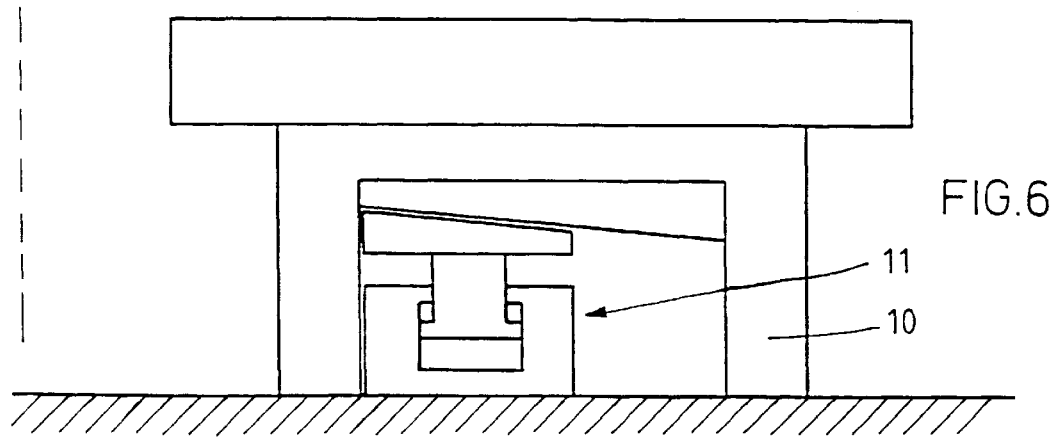
FIG. 6 shows the transport module according to FIG. 5 following a step of the frame relative to the support.

Starting with the position of a transport module 80 as shown for the frame 10 and the support 11 in FIG. 5, a load is now to be moved that rests on the frame 10. For this purpose, a pressure is built up in the pressure chamber 75 of the cylinder 31 on the piston side and as a result a force is exerted on the frame 10 through the wedge surfaces of the guide blocks 20 and 35 that reduces the force with which they rest on the floor. Finally, a pressure is reached in which the force of friction between the frame 10 and the floor is so small that the frame begins to slide down the wedge surface 36 of the support 11 by its wedge surface 25. As more pressure medium is added to the pressure chamber 75, the piston rod 55 of the cylinder 31 gradually extends so that a speed for the sliding movement of the frame is established as a function of the speed of the extending movement of the piston rod. At the end of the free movement range of the frame 10 relative to the support 11, the supply of oil to the pressure chamber 75 is halted so that the piston rod stops as well and the frame 10 rests firmly on the floor. As can be seen from FIG. 6, which shows the state that has been reached, the frame 10 has now moved to the right while the support 11 is in the same position as in FIG. 5. Now the pressure is relieved on the piston side of pressure chamber 75 and a pressure is developed in the pressure chamber 76 on the piston rod side. The ball bearings 40 on guide block 35 rest on the guide strips 26 of the guide block 20. The support 11 hangs from frame 10, so to speak. Finally, the frictional force between the support 11 and the floor is so small that the ball bearings 40 begin to roll down guide strips 26. In order for the movement not to end immediately once again, the piston rod 55 is gradually retracted into the cylinder 31, so that the support 11 rolls on the frame 10 up to the end of the possible movement range. Finally the support 11 assumes the position shown in FIG. 7. It is clear that the relative position between the frame 10 and the support 11 is the same as in FIG. 5, but that both parts of transport module 80 have moved a certain distance from the position shown in FIG. 5.

Figure 8:
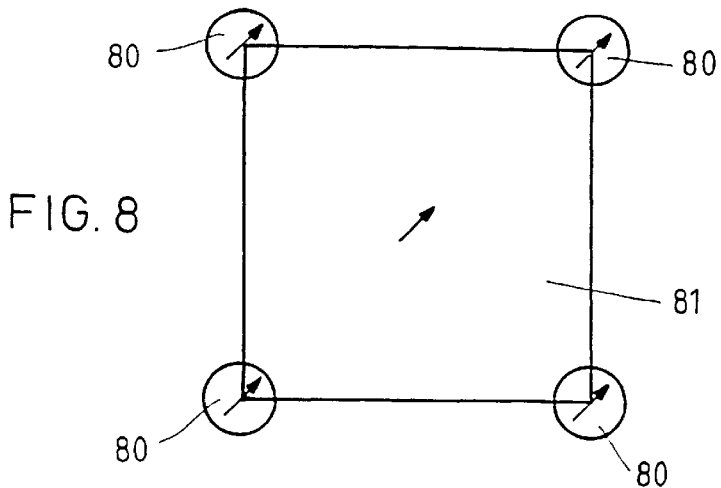
FIG. 8 shows a load supported by four transport modules, with the load being displaced while maintaining its orientation.

Basically, a load can be transported using only one transport module. Usually, however, a heavy load is supported by a plurality of transport modules. If this load is to be moved in a straight line, the guide blocks 20 and 35 of all the transport modules used are all aligned in the same direction as shown in FIG. 8, which shows a load 81 supported by four transport modules 80. The direction of the greatest slope of the wedge surfaces on the frame 10 and on the support 11 are indicated by the arrows in the transport modules. The movement direction of the load corresponds to the direction of these arrows. If the load is to be moved in a direction other than that shown in FIG. 8, in a state in which the support 11 is lifted slightly off the floor by pressurizing the pressure chamber 76 on the piston rod side, the guide block 20 of the frame 10 as well as the entire support is rotated with the aid of the hydraulic motor 73 around the axis 24 by the desired angle relative to the plate 13 and the jacket 12 of the frame. The wedge surfaces of all of the transport modules are then once again aligned in the same direction in which the load is being moved while retaining its orientation.

Figure 9:
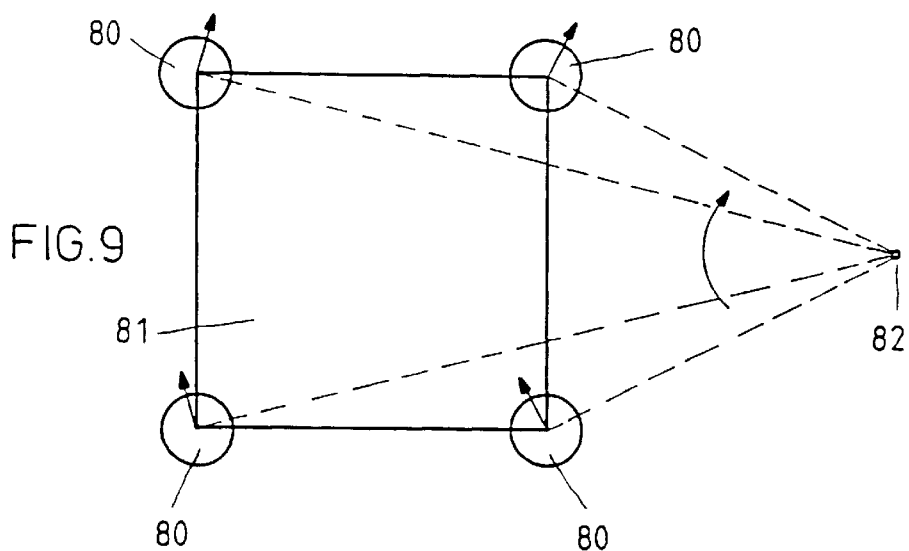
FIG. 9 shows a load supported by four transport modules, with the load being rotated around an axis located outside of itself.

If it is desired to move a load around a curved curve, and thereby also change the orientation of the load to correspond to the curvature of the curve, the wedge surfaces of the transport modules 80 supporting the load must be aligned differently. In FIG. 9, the arrows in the transport modules 80 indicate the alignment for the case in which the transport modules support a load 81 at the four corners of a square and the load is to be pivoted around a pivot point 82 located outside this square. The guide blocks 20 and 35 are aligned so that the direction of the maximum slope on the wedge surfaces is perpendicular to lines that connect the pivot point 82 with the central axis 24 of the respective frame 10 and which are shown dashed in FIG. 9.

When rounding a curve according to FIG. 9, the movement of the guide block in the direction of the maximum slope of the wedge surfaces has a transverse movement and a pivoting movement superimposed upon it. This superimposition is possible because of the play that exists in the transverse direction between the two guide blocks. Without this play, the two guide blocks would jam and prevent travel around a curve. The pivoting between the guide blocks 20 and 35 that exists at the end of the movement of the frame 10 relative to the support 11 is canceled by the centering devices 45 while the support 11 follows the frame. The next movement step can be made without additional rotation of the guide blocks relative to the floor support bodies 12, 13 of the frame 10. With very slight curvatures of the line of movement of a load, it can become necessary to shorten the step length.

Figure 10:
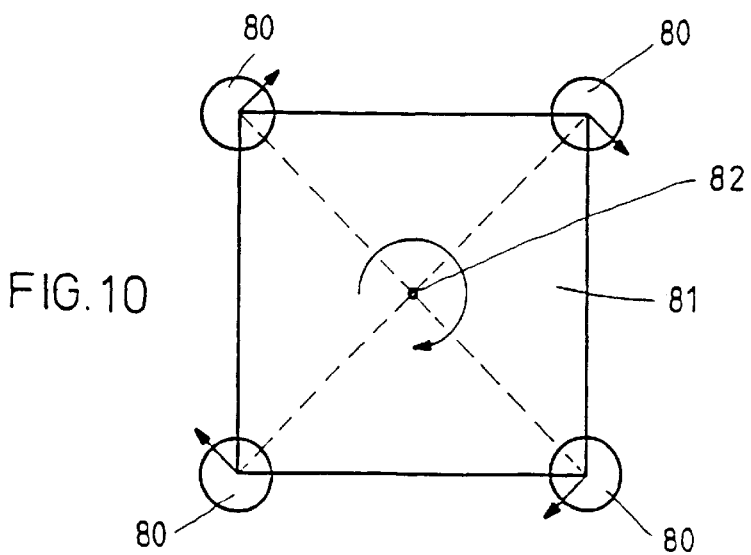
FIG. 10 shows a load supported by four transport modules that is rotated around its own axis, with the four transport modules each being located the same distance from the axis and located in the corners of a square.

According to FIG. 10 a load 81 supported by a plurality of transport modules 80 can also be rotated on the spot. Once again the edge surfaces are aligned perpendicularly to lines that extend from the pivot point 82 of the load to the axis 24 of the frame.

We claim:

1. Transport module provided for moving a heavy load over a floor, the module comprising:

a) a frame for supporting the load on the floor;

b) a support resting on the floor, and located between the frame and the floor;

c) an actuator operative to develop a lifting force by the support against the frame, wherein the lifting force may be positive to reduce a force with which the frame rests on the floor by increasing the force with which the support abuts the floor, and wherein the lifting force may be negative to reduce the force with which the support abuts the floor to a point below its own weight by increasing the force with which the frame abuts the floor;

d) wherein the frame and the support have, respectively, a first guide block with an inclined surface and a second guide block with an inclined surface interfacing with the inclined surface of the first block, the first and the second blocks enabling the frame to be supported on the support and the frame to be moved horizontally relative to the support with sufficient reduction of the force with which the frame rests on the floor; and e) the module further comprises a roller assembly for supporting the support on the frame and enabling the support to be moved horizontally with respect to the frame upon a reduction of the force that the support applies to the floor.

2. Transport module according to claim 1, wherein the frame grips the support, via the roller assembly, below an interface between inclined surfaces of the first and the second blocks, and wherein the roller assembly comprises a triangular array of three rollers carried by the support, and guide strips on the frame engage the rollers.

3. Transport module according to claim 2, wherein the interface of the inclined surfaces is located above the rollers of the roller assembly.

4. Transport module according to claim 1, wherein the inclined surfaces of the first and the second blocks are slidable on one another, and a surface of the frame receiving rollers of the roller assembly that roll thereon is inclined.

5. Transport module according to claim 4, wherein the frame has a groove defining said surface upon which said rollers roll.

6. Transport module according to claim 5, located at the corners of a triangle, and a groove of the frame provides an inclined surface receiving the rollers.

7. Transport module according to claim 6, wherein the roller assembly comprises precisely three rollers, two of the rollers are located in a common plane that runs perpendicularly to their axes, and the third roller is located at a distance from this plane approximately centrally between the two other rollers.

8. Transport module according to claim 5, wherein one roller of the roller assembly is formed by the outer race of a roller bearing that is permanently attached to its inner race.

9. Transport module according to claim 1, further comprising a universal joint provided between the second guide block and the support.

10. Transport module according to claim 9, wherein the actuator is part of the support and is operative to vary the vertical position of the second guide block relative to a floor support body of the support.

11. Transport module according to claim 1, wherein the actuator is part of the support and is operative to vary a vertical position of the second guide block of the support relative to a floor-contacting portion of the support.

12. Transport module according to claim 1, wherein the actuator is a double-acting hydraulic piston-cylinder unit, and the support (11) comprises the piston-cylinder unit of which the cylinder can be placed on the floor and its piston rod fastened to its piston, wherein the piston emerges from the cylinder facing away from the floor, and the second guide block is supported by the piston rod, and wherein the frame is made pot-shaped and inverted over the support, and has internally at its bottom the first guide block.

13. Transport module according to claim 1, wherein a supporting part of the frame has a supporting surface for the load, and is tiltable in all directions.

14. Transport module according to claim 1, wherein the frame comprises a floor support body, and the first and the second guide blocks are rotatable relative to the floor support body of the frame jointly around a vertical axis.

15. Transport module according to claim 14, wherein the first and the second guide blocks can be rotated in an angle range of at least 270° relative to the floor support body of the frame.

16. Transport module according to claim 14, further comprising a motor located on the frame for rotating the guide blocks.

17. Transport module according to claim 1, wherein there is lateral play between the two guide blocks, and the module further comprises centering means provided for centering the first and the second guide blocks with respect to one another in a central position.

18. Transport module according to claim 17, wherein the centering means comprise a centering device with at least one spring supported on the second guide block and at least one spring support which, in each relative position of the first and the second guide blocks in the guide direction towards one another, can be pressed by the spring against the other guide block.

19. Transport module according to claim 18, wherein the centering means comprise a centering device that has a spring located on the second guide block and two spring supports guided on the second guide block transversely to a travel direction of the first and the second guide blocks between which the spring is stretched and which are forced outward by the spring, and wherein the travel of each spring support outward is limited by a stop on the second guide block in such fashion that in the middle position of the first and the second guide blocks with respect to one another, one spring support is located spaced apart from the stop or from the other guide block (20).

20. Transport module according to claim 18, wherein the centering means comprise centering devices that move along with one of the guide blocks and are located at a distance from one another in the travel direction of the guide blocks.

21. Transport module according to claim 17, wherein the support has a rotary joint with a vertical axis and the second guide block is rotatable relative to a floor support body of the support around the vertical axis of the rotary joint.

22. Transport module according to claim 17, further comprising a travel sensor and wherein relative movement between the frame and the support in the travel direction can be detected by the travel sensor.

23. Transport module according to claim 22, wherein the frame has a first guide block with a first wedge surface and the support has a second guide block with a second wedge surface, and wherein a part of the travel sensor is accommodated in a recess in an inclined surface of one of the guide blocks.

24. Transport module according to claim 1, wherein a supporting part of the frame has a supporting surface for the load and, the supporting surface for the load is adjustable heightwise.

25. Transport module according to claim 24, further comprising a hydraulic lifting cylinder within the frame, and wherein the supporting part of the frame is adjustable heightwise by the hydraulic lifting cylinder of the frame.

* * * * *